United States Patent
Wada

(10) Patent No.: US 6,833,836 B2
(45) Date of Patent: Dec. 21, 2004

(54) IMAGE RENDERING PROCESS FOR DISPLAYING THREE-DIMENSIONAL IMAGE INFORMATION ON A TWO-DIMENSIONAL SCREEN

(75) Inventor: Shinya Wada, Kanagawa (JP)

(73) Assignee: Sony Computer Entertainment, Inc. (JP)

( * ) Notice: Subject to any disclaimer, the term of this patent is extended or adjusted under 35 U.S.C. 154(b) by 112 days.

(21) Appl. No.: 10/200,962

(22) Filed: Jul. 23, 2002

(65) Prior Publication Data

US 2003/0034981 A1 Feb. 20, 2003

(30) Foreign Application Priority Data

Jul. 27, 2001 (JP) .......................................... 2001-227907
Mar. 1, 2002 (JP) .......................................... 2002-055981

(51) Int. Cl.[7] ............................. G06T 15/00; G09G 5/00
(52) U.S. Cl. ........................ 345/581; 345/582; 345/426; 345/589; 345/601; 345/564
(58) Field of Search ................................. 345/418, 421, 345/422, 423, 428, 581–583, 586–587, 589, 593, 601, 564, 545, 549, 419, 426, 600, 602, 612; 382/162, 165, 172, 241, 274, 276

(56) References Cited

U.S. PATENT DOCUMENTS 5,123,085 A * 6/1992 Wells et al. ................. 345/421
6,191,793 B1 * 2/2001 Piazza et al. ................ 345/582
6,747,660 B1 * 6/2004 Olano et al. ................ 345/582
2002/0030681 A1 * 3/2002 Ritter .......................... 345/426

FOREIGN PATENT DOCUMENTS

JP 7152925 A 6/1995
JP 11175748 A 7/1999
JP 11195134 A 7/1999

OTHER PUBLICATIONS

Introductory Edition CG Standard Textbook Complied by Introductory Edition CG Standard Textbook Editorial Committee of Computer Graphic Arts Society (CGARTS), May 27, 1997, p. 105.

* cited by examiner

Primary Examiner—Matthew C. Bella
Assistant Examiner—Wesner Sajous
(74) Attorney, Agent, or Firm—Lenner, David, Littenberg, Krumholz & Mentlik, LLP

(57) ABSTRACT

An image rendering device holds a table which contains color and brightness values at positions specified by two-dimensional coordinates, where the color values are aligned so as to express a gradation of color tone along one coordinate axis of the two-dimensional coordinate, and the brightness values are aligned so as to express a gradation of brightness along the other coordinate axis. The image rendering device finds parameters corresponding to at least one of color and brightness of a polygon to be rendered, and generates an address for referencing a two-dimensional coordinate corresponding to each pixel composing the polygon based on the parameters. The image rendering device then acquires from the table color and/or brightness values corresponding to the address for referencing the two-dimensional coordinate. This successfully realizes natural expression by the image rendering device without preparing in advance a huge number of textures.

19 Claims, 8 Drawing Sheets

IMAGE RENDERING PROCESS FOR DISPLAYING THREE-DIMENSIONAL IMAGE INFORMATION ON A TWO-DIMENSIONAL SCREEN

CROSS-REFERENCE TO RELATED APPLICATIONS

This application claims priority from Japanese Patent Application No. 2001-227907 filed on Jul. 27, 2001, and No. 2002-55981 filed on Mar. 1, 2002, the disclosures of which are hereby incorporated by reference herein.

BACKGROUND OF THE INVENTION

The present invention relates to a rendering process for displaying three-dimensional image information on a two-dimensional screen, such as on a television monitor, a device used therefor, a recording medium having recorded thereon an image rendering program, and such image rendering program.

There are accelerating trends in higher integration and faster processing speed of processors and memories in recent television game consoles and personal computers, so that an image rendering device composed of such a game console or personal computer can generate, from three-dimensional image information, fine two-dimensional images with real presence in a real-time manner and can display them on two-dimensional monitor screens.

When a three-dimensional image is rendered on a two-dimensional monitor screen, the image rendering device subjects three-dimensional polygon data to various geometry processing, such as coordinate conversion, clipping and lighting, and further subjects the resultant data to transparent projection conversion. The image rendering device also pastes textures having various colors and patterns onto polygons to thereby give desired colors and patterns to the objects. Such pasting of textures onto polygons is generally referred to as texture mapping.

By employing a rendering technique described below, the image rendering device can generate a so-called specular image, which is an image expressing a water surface or the like having a light source caught thereon. To prepare a specular image, the image rendering device first sets R, G and B values for the individual apexes of polygons in an area where the light source will be caught. The image rendering device then performs linear interpolation between the brightness of adjacent apexes through processing such as so-called flat shading or Gouraud shading.

According to such rendering technique, R, G and B values will change in a linear manner between adjacent apexes of polygons, and adjacent polygons may have considerably different brightnesses. It is therefore difficult to express a natural specular image with such rendering technique.

The image rendering device may employ another rendering technique to generate a specular image having a light source caught on a water surface and so forth. The image rendering device in this case has stored therein as many textures as possible which are previously prepared in order to handle variations in the brightness of the light source or colors. The image rendering device finds R, G and B values for the individual apexes of polygons based on normal line vectors of the polygon apexes, line-of-sight vectors, the direction of the light source, and the color and brightness of the light source, and performs texture mapping corresponding to the thus obtained R, G and B values. Such rendering technique is advantageous in that it ensures a more natural expression, for example, of the sun or moon caught on the water surface as compared with the foregoing rendering technique.

This rendering technique is, however, disadvantageous in that it needs a vast number of textures so as to handle wide variations in the brightness of the light source or color.

Assuming now that the light source is the sun or moon, the actual sun or moon looks different in color or brightness depending on its altitude from the ground (i.e., elevation angle) and the weather conditions (clear, slightly cloudy, humidity in the air, airborne dust). The apparent color and brightness of the sun or moon also vary with time due to travel of such heavenly bodies (i.e., apparent movement due to the autorotation of the earth). Therefore, in order to achieve a more natural expression of the sun or moon caught on the water surface, the image rendering device should preliminarily prepare and store a huge number of textures capable of expressing all colors and brightnesses which correspond to the altitude or weather conditions and which vary with time. Moreover, reflectivity on the water surface can vary depending on the incident angle of light coming onto the water surface and the angle of reflection of light reflected from the water surface, that is, depending on the angle of line-of-sight away from the water surface. This also causes a drastically increased number of textures that the image rendering device should prepare and store in order to express all variations of such reflectivity.

SUMMARY OF THE INVENTION

The present invention was proposed to address the foregoing problems, and an object thereof resides in providing an image rendering method especially capable of achieving more natural expression of the sun or moon caught on the surface of water without preparing a huge number of textures, and also resides in providing a device used therefor, a recording medium having recorded thereon an image rendering program, and such image rendering program.

According to the present invention, parameters corresponding to at least the color or brightness of a polygon to be rendered are added to apex information of such polygon, and based on such parameters an address for referencing a two-dimensional coordinate corresponding to each pixel composing such polygon is generated. Color and/or brightness values corresponding to the address are then acquired and assigned to the individual pixels, where the table contains color and brightness values at positions specified by two-dimensional coordinates, such color values being aligned so as to express a gradation of color tone along one coordinate axis of such two-dimensional coordinates, and such brightness values being aligned so as to express a gradation of brightness along the other coordinate axis of such two-dimensional coordinates. The table is typically provided as a texture.

In other words, the present invention sets color and brightness values of a polygon in which a light source will be caught by acquiring color and brightness values of the individual pixels from a table based on two-dimensional coordinate values added to the apex information of such polygon. The present invention is successful in rendering a polygon having a light source caught thereon by using such table as a texture, which is attainable by a process similar to the general texture mapping without the need for special processing.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the invention in practice.

DETAILED DESCRIPTION

Figure 1:
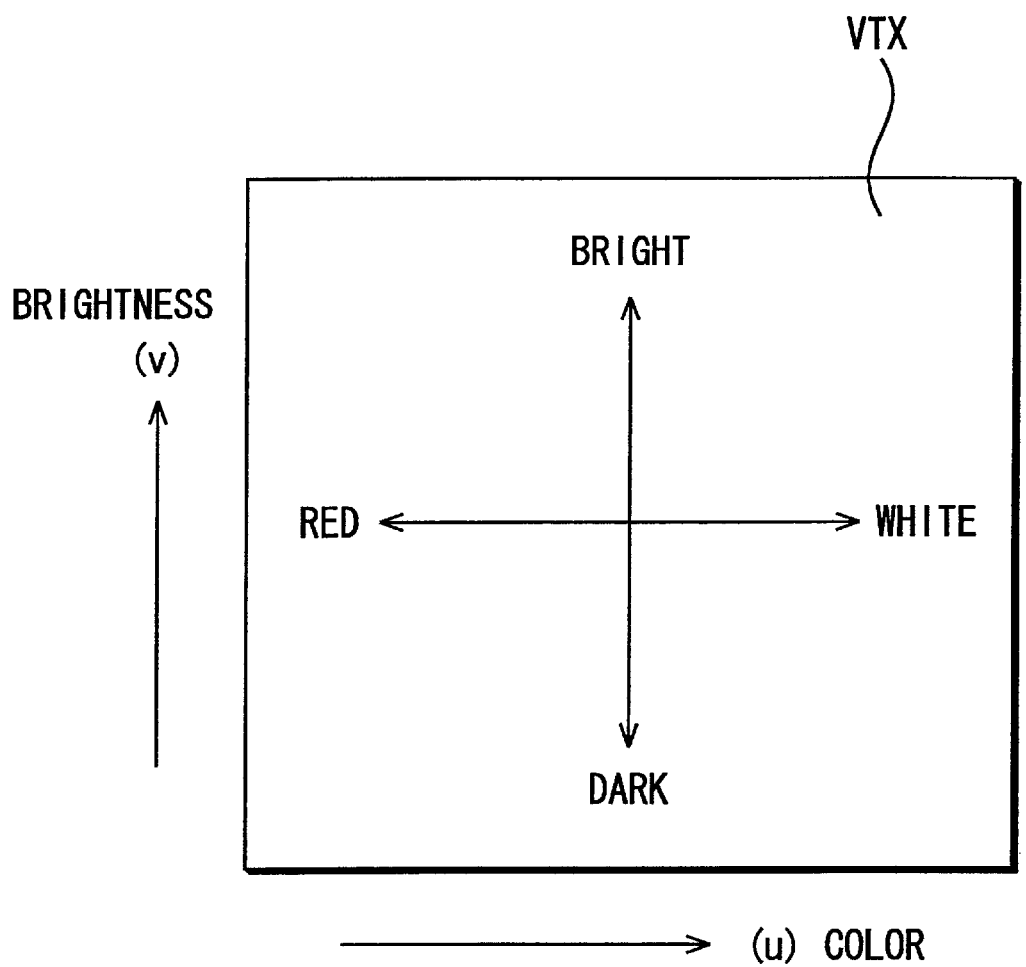
FIG. 1 is a drawing for explaining a vertex color texture.

Various embodiments of the present invention will be described with reference to the accompanying drawings. It is to be noted that the same or similar reference numerals are applied to the same or similar parts and elements throughout the drawings, and the description of the same or similar parts and elements therefore will be omitted or simplified.

The image rendering device of the present invention has stored in the buffer thereof a table VTX composed of color and brightness values as shown in FIG. 1.

The individual values for expressing color and brightness in the table VTX are addressable by parameters u and v which are two-dimensional coordinate values. The value of the parameter u shown in FIG. 1 gradually increases from left to right along the direction of the abscissa in this drawing, and the value of the parameter v gradually increases from bottom to top along the direction of the ordinate. The table VTX is also designed to have color tones vary gradually in correspondence to the gradual changes in the parameter u, and brightness vary gradually in correspondence to the gradual changes in the parameter v. In other words, the table VTX has gradation both in the changes in color along the direction of the abscissa in the drawing, and in the changes in brightness along the direction of the ordinate. Of course, the table VTX in FIG. 1 merely shows one exemplary case, so that it is also possible for brightness to be expressed by the parameter u and color by the parameter v. Various color gradations are available beside the illustrated example having a gradation by which the color tone gradually changes from red to white, and possible examples thereof include those causing color changes from blue→black, blue→red, and white (or light yellow) →orange→red→ultramarine blue→black. The brightness gradation shown in FIG. 1, in which the brightness changes from "dark" to "bright" as the parameter v becomes larger, may be inverted. The image rendering device may store different color tables VTX in the buffer.

The table VTX can be provided as a texture since the table is composed of the individual values for expressing color and brightness. In the present embodiment, the table VTX shown in FIG. 1 is now defined to be stored in a texture buffer as one texture. That is, the table VTX is stored in the texture buffer as one texture which comprises texels respectively having color and brightness values. Of course, the texture buffer stores general textures used for so-called texture mapping. It should now be noted that the table VTX is specifically referred to as vertex color texture VTX.

In the rendering of a specular image in which a light source is caught on a polygon surface which composes a water surface or the like, the image rendering device first determines the color and brightness of the polygon to be rendered, and determines parameters to be assigned to the apexes of the polygon for texture mapping (hereinafter referred to as texture addresses U, V) corresponding to such color and brightness of the polygon to be rendered. The image rendering device then sets the texture addresses U, V to the parameters u, v of the vertex color texture VTX shown in FIG. 1. In other words, the vertex color texture VTX herein is used as a lookup table for deciding the brightness and color of the apexes of the polygon. The image rendering device then finds addresses for making reference to texels corresponding to the individual pixels in the polygon, makes reference to the color and brightness in the vertex color texture VTX using the parameters u, v corresponding to the addresses for making reference to the texels, and then maps them onto the polygon. It should now be recalled that the color and brightness values in the vertex color texture VTX are aligned in a gradated manner, from which various colors are available, so that the image rendering device can artificially realize a variety of interpolations of color and brightness within the polygon.

Figure 2:
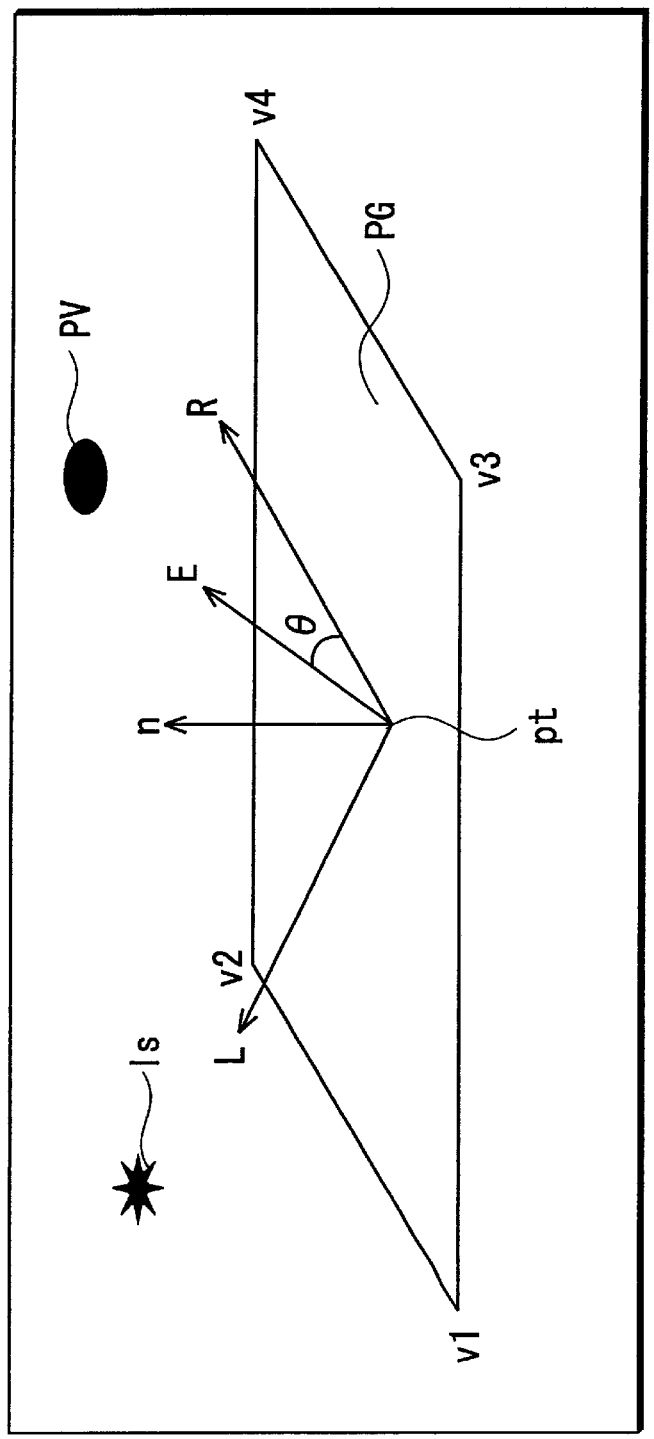
FIG. 2 is a drawing for explaining how to find a specular component and how to decide parameters v for polygon apexes.

The following paragraphs describe how the image rendering device can determine the parameters u, v for the polygon apexes and can assign the color and brightness thereto, referring to an exemplary case shown in FIG. 2 in which a specular image having sunlight caught on the water surface is rendered. It should be noted that all sizes of vectors L, n, E, R are normalized to "1" in FIG. 2 for the convenience of explanation.

The explanation will start with a method for deciding a parameter v.

The image rendering device finds the brightness of a polygon PG composing the water surface in which the sun (referred to as a light source Is) will be caught, where the found brightness is converted into the size of a specular component. More specifically, the image rendering device finds a normal line vector n which stands at a certain point pt on the polygon PG and a light source vector L directed from such point pt towards the light source Is, and then finds a reflection vector R based on the light source vector L and the normal line vector n. Next, the image rendering device finds a line-of-sight vector E directed from such point pt towards the point of view PV, and further finds the angle θ between the line-of-sight vector E and the reflection vector R. The image rendering device finally finds the cosine value a of the angle θ between the line-of-sight vector E and the reflection vector R, which value is assumed as the size of the specular component.

Assuming now the cosine value a of the angle θ between the line-of-sight vector E and the reflection vector R is equal to 1 (i.e., θ=0°), light reflected from the light source Is will look the brightest since the specular component will be a maximum. On the contrary, assuming now the cosine value a of the angle θ between the line-of-sight vector E and the reflection vector R is equal to 0 (i.e., θ=90°), reflected light of the light source Is will not be visible from the point of view PV since the specular component will be 0. In other words, the specular component increases as the angle E decreases, and vice versa.

Based on such principle, the image rendering device will successfully introduce the light from the light source onto the polygon with a brightness corresponding to the angle θ by selecting the parameter v depending on the cosine value a which varies from 0 to 1 for expressing the specular component, and by making reference to the brightness value from the vertex color texture VTX using such parameter v. In other words, the image rendering device selects a larger value for the parameter v as the angle θ becomes smaller, and a smaller value for the parameter v as the angle θ becomes larger. Using such parameter v in order to make reference to the brightness value from the vertex color texture VTX, the image rendering device can render a specular image having the light source caught on the polygon in a brightness which depends on the angle θ between the line-of-sight vector E and the reflection vector R.

In a more specific example of processing, the image rendering device selects the parameter v from the vertex color texture VTX assuming f(a)=v, where f(a) is a function using, as an argument, the cosine value a of the angle θ between the line-of-sight vector E and the reflection vector R, and assigns such parameter v to the individual apexes v1, v2, v3, v4 of the polygon PG.

This allows the image rendering device to successfully express the brightness depending on the specular component.

The next paragraphs will describe a method for determining the parameter u. It is to be noted that the example herein deals with a method for determining the parameter u for the case in which the color of the light source caught on the polygon PG composing the water surface varies with time. For the case using the vertex color texture VTX in which the color tone varies from white to red in a gradated manner as the value of parameter u decreases, as shown in FIG. 1, the image rendering device will be successful in expressing a transient scene from daytime to evening in which the sunlight gradually turns to red to display an evening glow if value of the parameter u is gradually decreased with the elapse of time.

When the color of the light source caught on the polygon is to be varied with time, the image rendering device selects the parameter u from the vertex color texture VTX assuming g(t)=u, where g(t) is a function using time t as an argument, and assigns such parameter u to the individual apexes v1, v2, v3, v4 of the polygon PG.

By thus setting the parameter u, which varies with time, as texture addresses U for the polygon apexes v1, v2, v3, v4, the image rendering device can express a scene in which the color of a portion where the light source is caught will vary with time. It is, of course, possible for the image rendering device to assign the parameter v to the polygon apexes assuming g(t)=v, to thereby vary the brightness of the light source caught on such polygon with the elapse of time.

Figure 3:
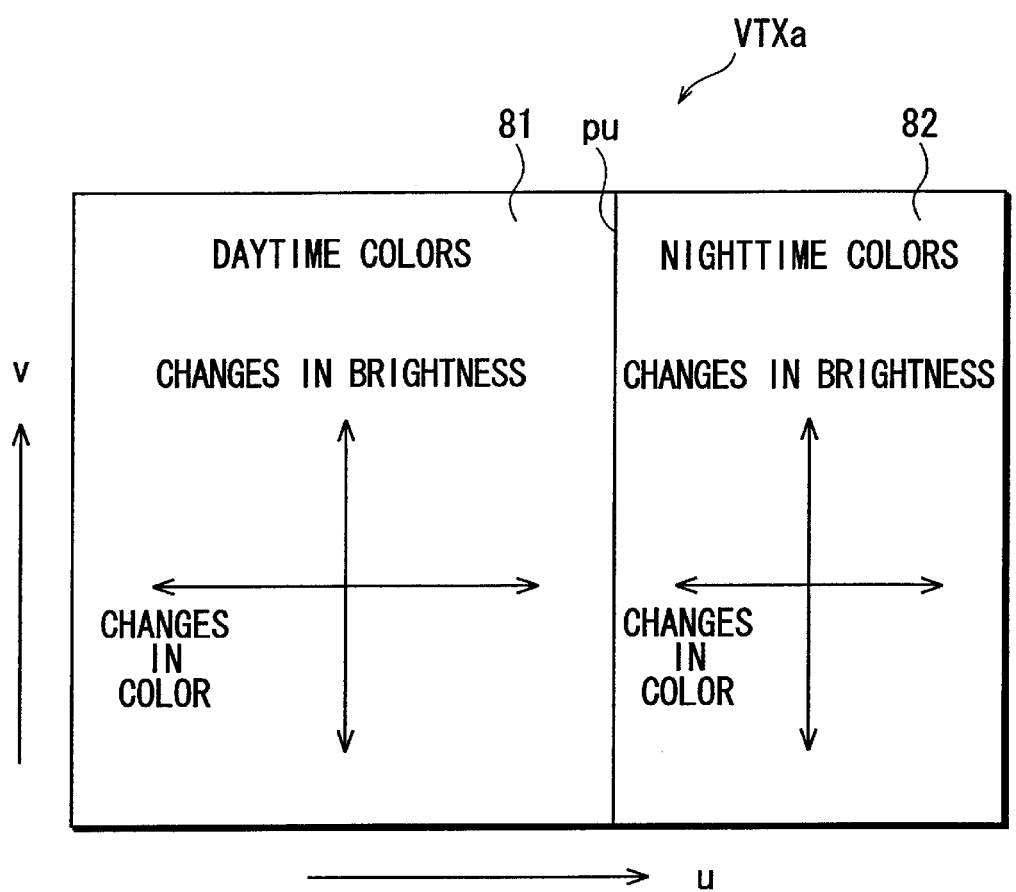
FIG. 3 is a drawing for explaining a vertex color texture having daytime and nighttime colors based on zonal division.

Another possible example is to use the vertex color texture VTX having zones bounded by the parameter u of a certain value, where the divided zones have different colors. FIG. 3 shows an exemplary vertex color texture VTXa divided by a line segment expressed by pu in the figure, where a zone 81 corresponding to the parameter u in the region below the boundary expressed by the line segment pu contains daytime-related colors (e.g., the color of sunlight caught on the ocean surface in the daytime), and a zone 82 corresponding to the parameter u in the region above the boundary expressed by the line segment pu contains nighttime-related colors (e.g., the color of moonlight caught on the ocean surface in the nighttime). By using such vertex color texture VTXa, the image rendering device can effectively express the catching of the light source both in the daytime scene and the nighttime scene.

In other words, by using the vertex color texture VTXa shown in FIG. 3 and selecting the parameter u while assuming g(t)=u, the image rendering device will successfully realize a rendering in which the catching of the light will continuously vary from the daytime scene to the nighttime scene with the elapse of time.

A more natural expression of the caught light transient from the daytime to the evening and then to the nighttime will be available if an additional zone containing the colors of the setting sun caught on the ocean surface in the evening is provided between the zone 81 containing the colors of the sunlight caught on the ocean surface in the daytime and the zone 82 containing the colors of the moonlight caught on the ocean surface in the nighttime.

Figure 4:
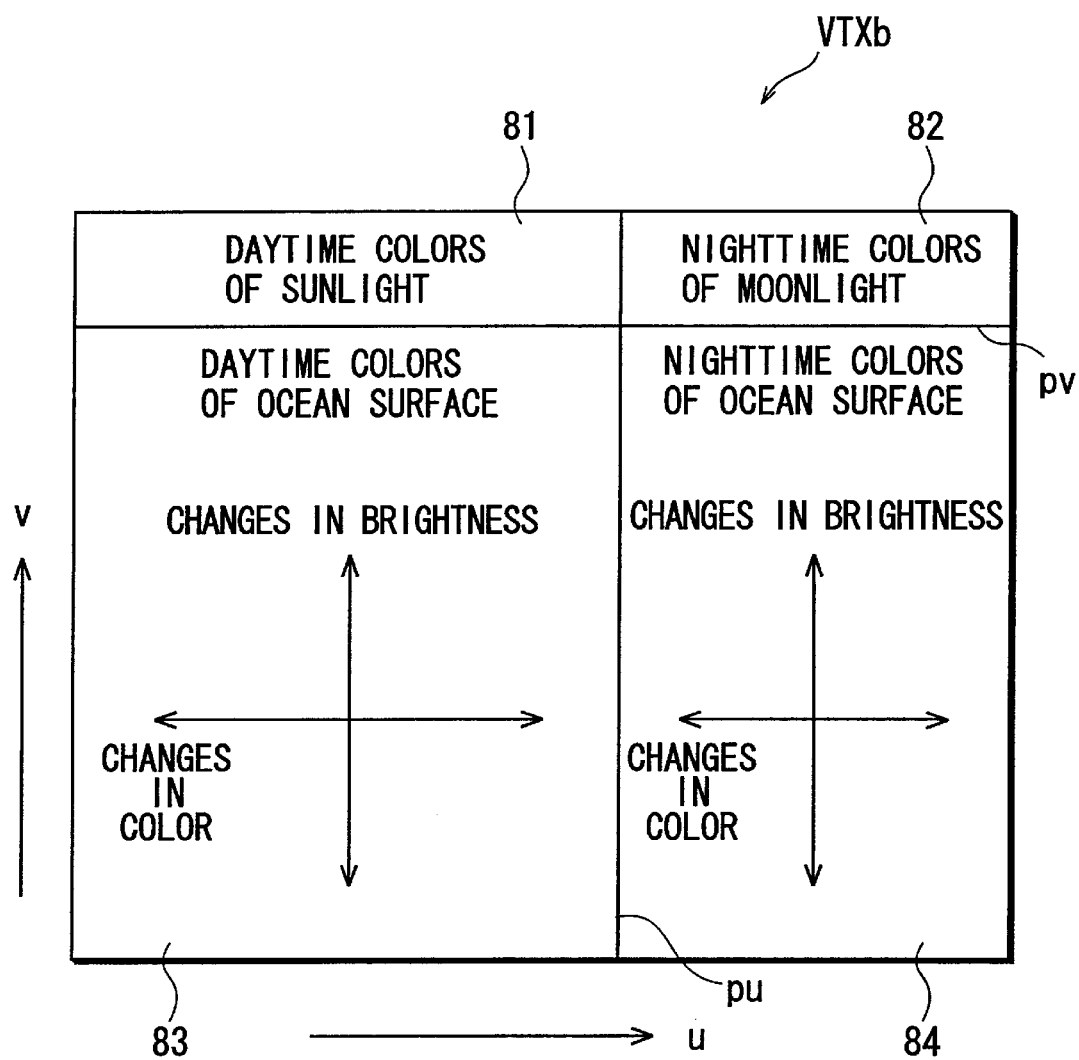
FIG. 4 is a drawing for explaining a vertex color texture having daytime and nighttime colors, and sunlight and moonlight colors based on zonal division.

In a still another example, the vertex color texture VTX may be divided in the direction of the parameter v as well as in the direction of the parameter u as shown in FIG. 4. The vertex color texture VTXb shown in FIG. 4 is divided by line segments expressed by pu and pv. In such vertex color texture VTXb, a zone 83 corresponding to the parameter u in the region below the boundary expressed by the line segment pu and the parameter v in the region below the boundary expressed by the line segment pv typically contains colors of the ocean surface in the daytime. A zone 81 corresponding to the parameter u in the region below the boundary expressed by the line segment pu and the parameter v in the region above the boundary expressed by the line segment pv contains colors of the sunlight caught on the ocean surface in the daytime. A zone 84 corresponding to the parameter u in the region above the boundary expressed by the line segment pu and the parameter v in the region below the boundary expressed by the line segment pv contains colors of the ocean surface in the nighttime. A zone 82 corresponding to the parameter u in the region above the boundary expressed by the line segment pu and the parameter v in the region above the boundary expressed by the line segment pv contains color of the moonlight caught on the ocean surface in the nighttime.

Also in the example shown in FIG. 4, by selecting the parameter u while assuming g(t)=u, the image rendering device will successfully realize a rendering in which the catching of the light will continuously vary from the daytime scene to the nighttime scene with the elapse of time similarly to the example shown in FIG. 3. A more natural expression of the caught light transient from the daytime to the evening and then to the nighttime will be available if the vertex color texture VTX to be employed has an additional zone containing the colors of the ocean surface during evening glow and a zone containing the colors of the setting sun.

Figure 5:
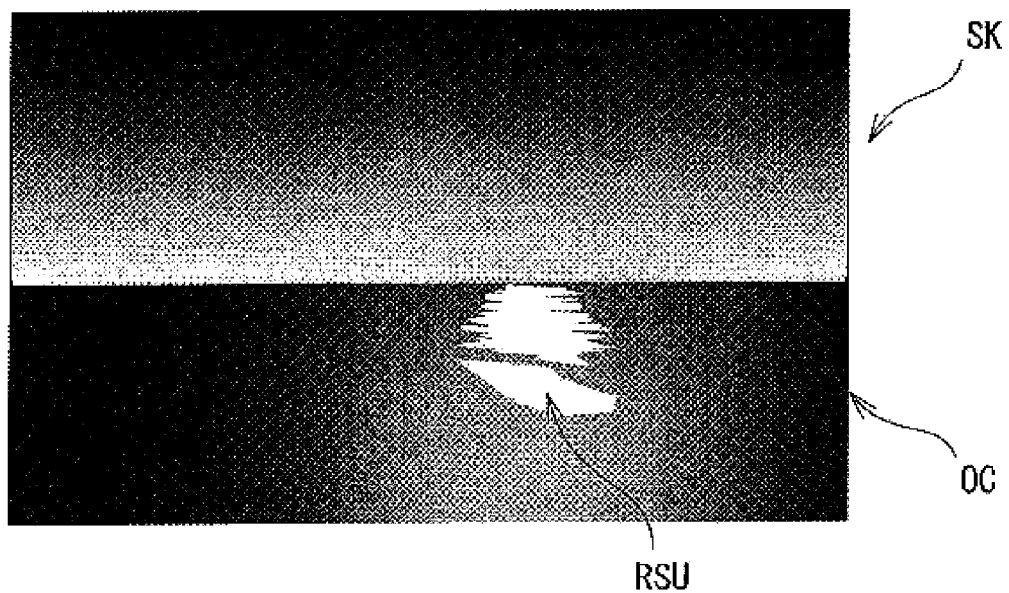
FIG. 5 is an image of an exemplary scene having sunlight caught on the ocean surface prepared by using the vertex color texture shown in FIG. 4.

FIG. 5 is an exemplary scene rendered using the vertex color texture VTXb shown in FIG. 4, in which a daytime sunlight RSU is caught on the ocean surface OC. FIG. 5 shows a specific case containing the sky SK and the ocean surface OC onto which the sunlight RSU is caught.

To produce the rendering shown in FIG. 5, the image rendering device selects the parameters u and v contained in the zone 81 of the vertex color texture VTXb shown in FIG. 4 for a portion where the cosine value a of the angle θ between the line-of-sight vector E and reflection vector R shown in FIG. 2 will be equal to or near 1, that is, for a portion where the light source (sun) is expected to be caught. On the other hand, the image rendering device selects the parameters u and v contained in the zone 83 of the vertex color texture VTXb shown in FIG. 4 for a portion where the cosine value a of the angle θ between the line-of-sight vector E and reflection vector R shown in FIG. 2 will be equal to or near 0, that is, for a portion where the light source (sun) will not be caught. Such selection of the parameters u and v from the zone 81 for the portion expected to catch the sun, and from the zone 83 for the portion not expected to catch the sun will successfully achieve a natural expression of the catching of the light as shown in FIG. 5, in which the ocean surface OC will have caught thereon the sun in a certain degree of size, and will have gradation in the color and brightness in the caught sunlight and the surrounding ocean surface OC.

The image rendering device can change the color of the ocean surface OC into the nighttime color by using the vertex color texture VTXb shown in FIG. 4, selecting the parameters u, v from the zone 82 for the moonlight portion caught on the ocean surface, and selecting the parameters u, v from the zone 84 for the ocean surface portion which does not catch the moonlight, to thereby obtain an expression that the sunlight RSU in FIG. 5 is altered to moonlight.

In still another example, each texel in the vertex color texture VTX may have an α value expressing transparency. The α value in this case has a value which varies corresponding to the gradated changes in the parameter v along the direction of the ordinate. For the case that each texel in the vertex color texture VTX has an α value, the image rendering device can typically achieve a rendering in which the water surface is expressed as semi-transparent depending on the angle between the line of sight and the line normal to the water surface, that is, a rendering capable of expressing variations in the reflectivity of the water surface.

Figure 6:
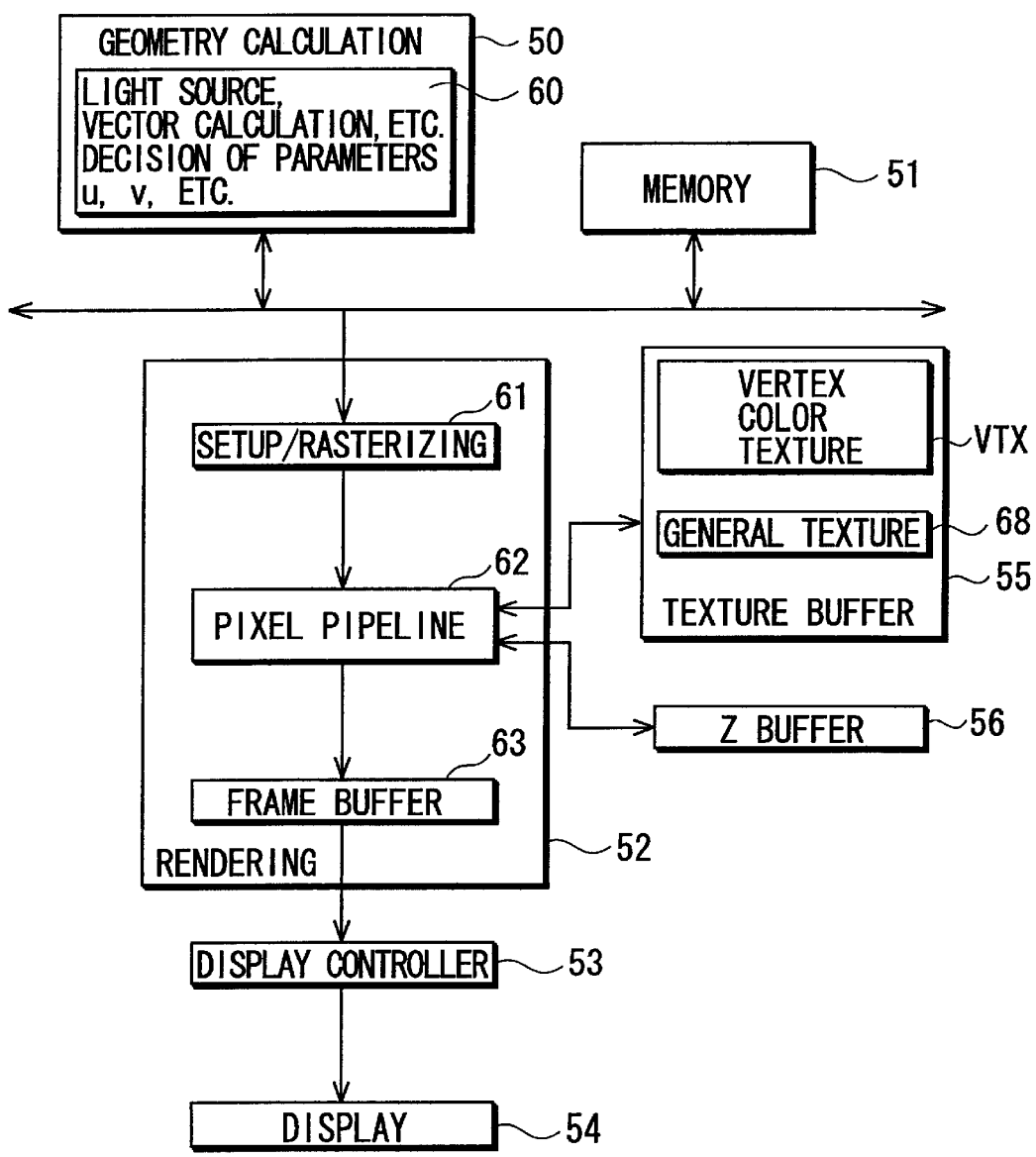
FIG. 6 is a block diagram of an exemplary constitution for realizing the rendering process.

FIG. 6 shows a specific constitution of the image rendering device for realizing the foregoing rendering process. It is to be noted that the image rendering device of the present embodiment relates to an exemplary case in which the rendering process of the present embodiment is realized on a hardware basis using a digital signal processor (DSP), a graphic processor (GP) or the like. For the case the rendering process is carried out by a DSP or GP, the individual components shown in FIG. 6 correspond to the internal processing unit of the DSP or GP.

In FIG. 6, a memory 51 stores graphic information of polygons or the like (apex information or apex-linked information such as coordinate values for apexes, RGB apex color values, map coordinate values and vector values). The graphic information herein is previously retrieved by being read out from various recording media such as a CD-ROM, DVD-ROM or semiconductor memory, or by being downloaded through communication or transmission media based on line or radio communications.

A geometry calculating section 50 retrieves stored graphic information from the memory 51, and then subjects the retrieved graphic information to so-called affine transformation, projection conversion onto a screen coordinate, light source processing for the apexes, matrix calculation and vector calculation.

The geometry calculating section 50 has a parameter deciding section 60 which is responsible for determining the parameter u depending on the color of the polygon to be rendered, and at the same time for determining the parameter v based on the light source is, light source vector L, normal line vector n, point of view PV, line-of-sight vector E, reflection vector R, and cosine value a (specular component) of the angle θ between the line-of-sight vector E and the reflection vector R explained above with reference to FIG. 2. In particular, for determining the parameter v which relates to the brightness of the light source caught on the polygon surface, the parameter deciding section 60 finds the light source vector L, normal line vector n of the polygon, reflection vector R and line-of-sight vector E, and then determines the parameter v based on the cosine value a (specular component) of the angle θ between the reflection vector R and line-of-sight vector E. Varying the parameter u with time by the parameter deciding section 60 will result in varying color with the elapse of time.

The graphic information (polygon data) output from the geometry calculating section 50 is sent to a rendering section 52. The rendering section 52 is responsible for calculations to display polygons on the screen, and converts the polygon data received from the geometry calculating section 50 into pixels. The rendering section 52 can roughly be divided into a polygon setup/rasterizing section 61 (hereinafter referred to as PSR section 61), a pixel pipeline section 62 and a frame buffer 63.

The rendering section 52 is accompanied by a texture buffer 55 and a Z buffer 56. The texture buffer 55 stores at least a normal texture 68 and the vertex color texture VTX. The Z buffer 56 stores Z values for expressing depth-wise distance of the image from the point of view. The vertex color texture VTX, normal texture 68 and Z values are previously retrieved by being read out from various recording media such as a CD-ROM, DVD-ROM or semiconductor memory, or by being downloaded through communication or transmission media based on line or radio communications.

The PSR section 61 of the rendering section 52 is responsible for retrieving and buffering of polygon data received from the geometry calculating section 50, and for pixel conversion and calculation of texel coordinate values (addresses for referencing two-dimensional coordinates) through rasterizing. The PSR section 61 is responsible for finding texel coordinate values for referencing the vertex color texture VTX using the parameters u, v of the polygon apexes. It is to be noted that for the case of pasting the general texture onto the polygon, the PSR section 61 generates the texel coordinate values for referencing the general texture 68. The PSR section 61 then sends the individual pixel data and texel coordinate values to the pixel pipeline section 62.

The pixel pipeline section 62 refers to the general texture 68 stored in the texture buffer 55 or to the texel color stored in the vertex color texture VTX using such texel coordinate values, and then performs texture mapping while taking the Z values in the Z buffer 56 into consideration. The pixel data output from the pixel pipeline section 62 after texture mapping is sent to the frame buffer 63.

The frame buffer 63 writes each pixel data at least in a memory space corresponding to a display (screen) of a television monitor or the like so as to correspond each pixel with the screen coordinate of such display. The frame-wise screen data thus generated by the frame buffer 63 is read out thereafter upon being requested by a display controller 53.

The display controller 53 generates horizontal synchronizing signals and vertical synchronizing signals of the television monitor, and also serially retrieves pixel color values from the frame buffer 63 in a line-feed manner in synchronization with the display timing of the monitor. The retrieved color values compose a two-dimensional image which will be displayed on a display 54, such as a television monitor.

Figure 7:
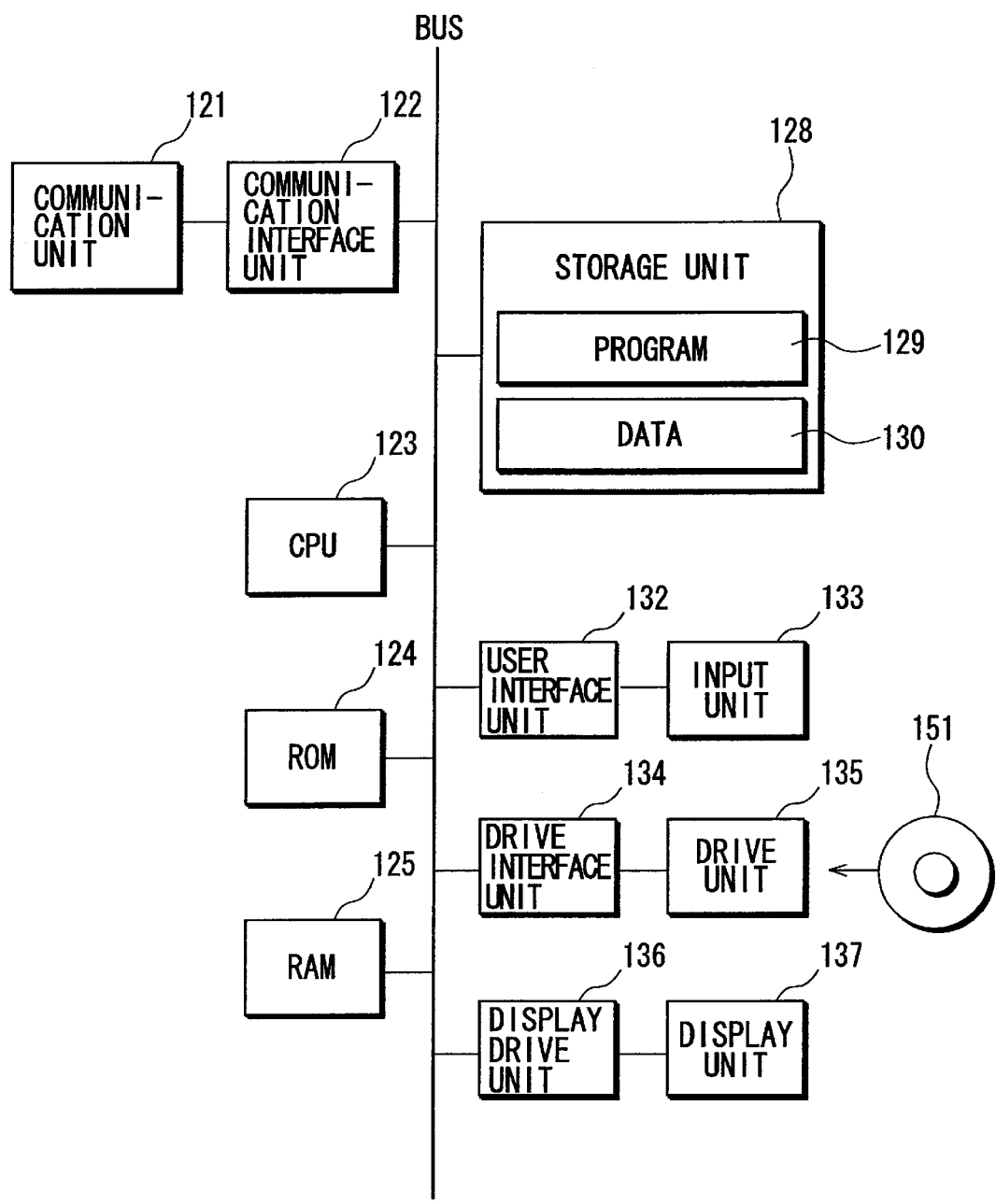
FIG. 7 is a block diagram of a schematic constitution of a computer for realizing the rendering process.
Figure 8:
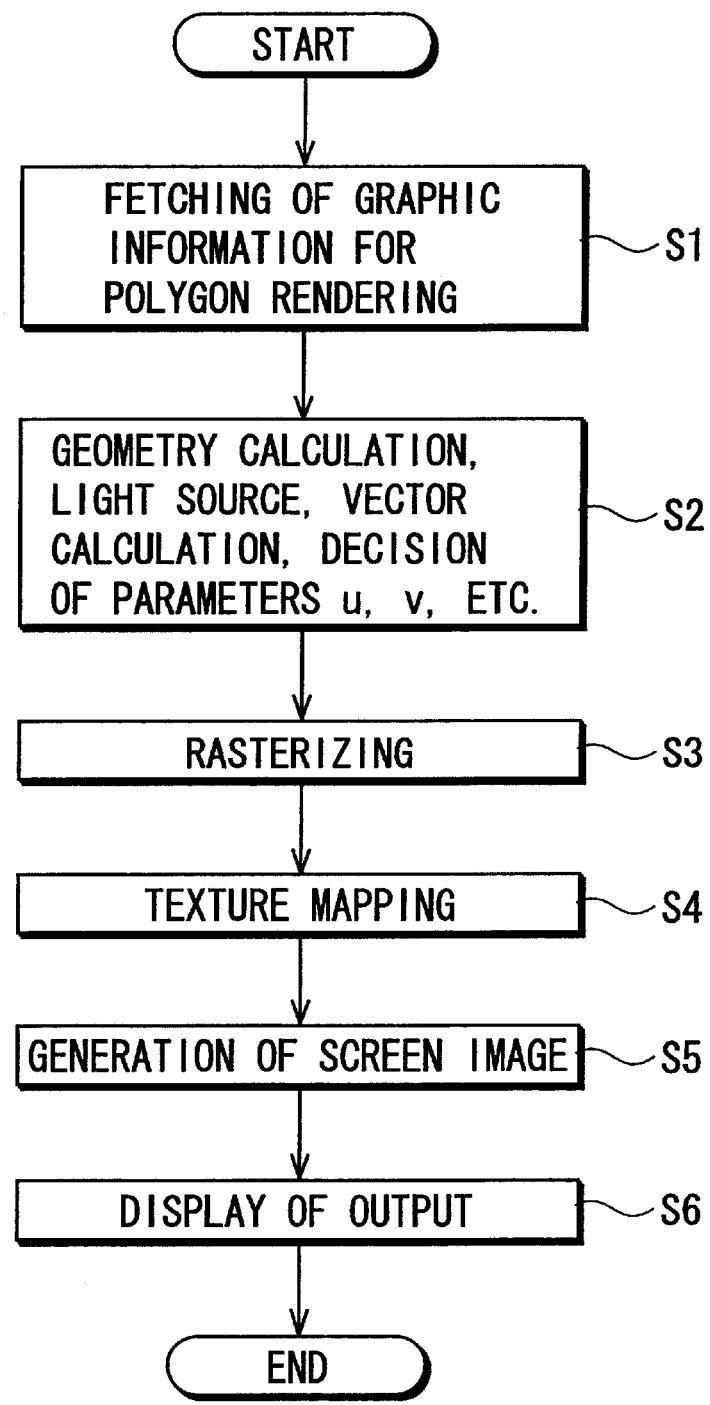
FIG. 8 is a flow chart of a process for achieving computer-assisted rendering processing.

The image rendering process of the present embodiment is not realized only by a hardware constitution, but of course also can be achieved on a software basis (using application programs for computers). FIGS. 7 and 8 show the constitution and operation of the image rendering process of the present embodiment as executed on a computer. FIG. 7 shows an exemplary constitution of the principal parts of the computer. FIG. 8 shows a process flow according to which a CPU 123 of the computer executes the image rendering program of the present invention.

In FIG. 7, a storage unit 128 typically comprises a hard disk and a drive therefor. Such storage unit 128 has stored therein an operating system program, a computer program 129 including the image rendering program of the present embodiment read out from various recoding media such as a CD-ROM or DVD-ROM or downloaded through a communication line, and a variety of data 130 such as graphic information for polygon rendering, general texture, vertex color texture VTX and Z values.

A communication unit 121 refers to a communication device responsible for data communication with external devices, which may be a modem for establishing a connection to an analog public telephone line, a cable modem for establishing a connection to a cable television network, a terminal adaptor for establishing a connection to an ISDN (integrated services digital network), or a modem for establishing a connection to an ADSL (asymmetric digital subscriber line). A communication interface (I/F) unit 122 refers to an interface device responsible for protocol transfer for enabling the sending and receiving of data between the communication unit 121 and an internal bus (BUS).

An input unit 133 refers to an input device such as a keyboard, mouse or touch pad. A user interface (I/F) unit 132 refers to an interface device for supplying signals from such input unit 133 to the internal devices.

A drive unit 135 refers to a drive device capable of reading out various data or programs from a recording medium, including a disk medium 151 such as a CD-ROM, DVD-ROM or floppy (trademark) disk, or from a card-type or other type of semiconductor memory. A drive interface (I/F) unit 134 refers to an interface device for supplying signals from such drive unit 135 to the internal devices.

A display unit 137 refers to a display device such as a CRT (cathode ray tube) or liquid crystal display. A display drive unit 136 is a device for driving such display unit 137.

The CPU 123 controls the entire operation of the personal computer based on the operating system program stored in the storage unit 128 or the computer program 129 of the present embodiment.

A ROM 124 typically comprises a rewritable non-volatile memory such as a flash memory, and stores a BIOS (basic input/output system) and various default values of the personal computer. A RAM 125 will have loaded therein application programs and various data read out from the hard disk of the storage unit 128, and is used as a work RAM of the CPU 123.

In the constitution shown in FIG. 7, the CPU 123 can accomplish the image processing as described above by executing the image rendering program of the present embodiment, which is read out from the storage unit 128 and loaded into the RAM 125.

The next paragraphs will describe, referring to FIG. 8, the process flow which takes place when the CPU 123 of the computer shown in FIG. 7 operates based on the image rendering program of the present embodiment.

In step S1 shown in FIG. 8, the CPU 123 retrieves from the storage unit 128 graphic information for polygon rendering, general texture, vertex color texture VTX and Z values which are, for example, preliminarily stored therein as data 130 after being read out from the storage unit 128, and then held in the RAM 125.

The CPU 123 then, in step S2, retrieves the graphic information held by the RAM 125, subjects the graphic information to affine conversion and projection conversion onto a screen coordinate, and at the same time determines the parameter u, and further determines the parameter v based on the light source Is, light source vector L, normal line vector n, point of view PV, line-of-sight vector E, reflection vector R, and cosine value a (specular component) of angle θ between the line-of-sight vector E and reflection vector R.

The CPU 123 then, in step S3, performs rasterizing and calculation of texel coordinate values using the polygon data obtained by the geometric calculation.

Then, in step S4, the CPU 123 generates the texel coordinate values from the parameters of the polygon apexes, refers to the texel colors in the general texture or vertex color texture VTX using such texel coordinate values, and then performs texture mapping.

The CPU 123 then, in step S5, generates a screen image from the pixel data after the texture mapping, and in step S6 sends information on such screen image to the display drive 136. An image will thus appear on the display unit 137.

As has been described above, the image rendering device of the present embodiment can successfully achieve a natural expression of the sun or moon caught on the water surface by setting the parameters u, v of the polygon apexes depending on the color and brightness of the polygon to be rendered, and by determining the color and brightness of each pixel by selecting them from the vertex color texture VTX. As a result, the image rendering device can achieve a natural expression of a light source caught on the polygon surface without preparing a huge number of textures.

Since the image rendering device of the present embodiment uses the vertex color texture VTX composed of general texel color data such as R, G, B values and an α value, it is not necessary to prepare special data or to provide a constitution for special processing, and therefore the process load of the rendering section or CPU will not increase.

Since the image rendering device varies the parameters u, v with the elapse of time during the rendering, the color and brightness can be expressed as variable with time which successfully realizes a more natural rendering.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, the image rendering process of the present embodiment is also applicable to various expressions other than where the light source is caught on the polygon surface. The vertex color texture VTX may not always be prepared in advance, and instead may be produced by the image rendering program immediately before the rendering process is actually started. The image rendering process of the present embodiment can be realized not only on specialized video game consoles or personal computers, but also on various information processing devices including personal digital assistants.

What is claimed is:

1. An image rendering process, comprising:

determining parameters representing at least one image characteristic for each vertex of a polygon, the at least one image characteristic being selected from the group consisting of color tone and brightness;

generating respective texel coordinates for each of a plurality of pixels representing the polygon; and referencing a table using the respective texel coordinates to obtain a corresponding value of the at least one image characteristic for each of the plurality of pixels, the table having values representing different combinations of color tone and brightness arranged by position such that the values vary along one coordinate axis by gradation of color tones and vary along another coordinate axis by gradation of brightness.

2. The image rendering process according to claim 1, wherein the gradation of brightness is expressed as a transparency ratio.

3. The image rendering process according to claim 1, wherein the step of determining the parameters further comprises:

finding a specular component generated by reflecting light emitted by a light source of a surface of the polygon; and determining the parameters representing the at least one image characteristic using the specular component when the at least one image characteristic is the brightness.

4. The image rendering process according to claim 1, further comprising:

altering the parameters representing the at least one image characteristic as a function of time.

5. The image rendering process according to claim 1, wherein the table is divided into a plurality of zones representing at least one of different colors and different illumination conditions.

6. The image rendering process according to claim 1, wherein the table is provided as a plurality of tables representing at least one of different colors and different illumination conditions.

7. An image rendering device, comprising:

a table holding section operable to store a table, the table having values representing different combinations of color tone and brightness arranged by position such that the values vary along one coordinate axis by gradation of color tones and vary along another coordinate axis by gradation of brightness;

a parameter deciding section operable to determine parameters representing at least one image characteristic for each vertex of a polygon, the at least one image characteristic being selected from the group consisting of color tone and brightness;

an address generating section operable to generate respective texel coordinates for each of a plurality of pixels representing the polygon; and an assigning section operable to reference the table using the respective texel coordinates to obtain a corresponding value of the at least one image characteristic for each of the plurality of pixels.

8. The image rendering device according to claim 7, wherein the gradation of brightness is expressed as a transparency ratio.

9. The image rendering device according to claim 7, wherein the parameter deciding section includes a specular component generating section operable to find a specular component generated by reflecting light emitted by a light source off a surface of the polygon, the parameter deciding section being operable to determine the parameters representing the at least one image characteristic using the specular component when the at least one image characteristic is the brightness.

10. The image rendering device according to claim 7, wherein the parameter deciding section alters the parameters representing the at least one image characteristic as a function of time.

11. The image rendering device according to claim 7, wherein the table stored by the table holding section is divided into a plurality of zones representing at least one of different colors and different illumination conditions.

12. The image rendering device according to claim 7, wherein the table holding section holds a plurality of tables representing at least one of different colors and different illumination conditions.

13. A computer-readable recording medium having recorded thereon a program for performing an image rendering process, the image rendering process comprising:

determining parameters representing at least one image characteristic for each vertex of a polygon, the at least one image characteristic being selected from the group consisting of color tone and brightness;

generating respective texel coordinates for each of a plurality of pixels representing the polygon; and referencing a table using the respective texel coordinates to obtain a corresponding value of the at least one image characteristic for each of the plurality of pixels, the table having values representing different combinations of color tone and brightness arranged by position such that the values vary along one coordinate axis by gradation of color tones and vary along another coordinate axis by gradation of brightness.

14. The computer-readable recording medium according to claim 13, wherein the gradation of brightness is expressed as a transparency ratio.

15. The computer-readable recording medium according to claim 13, wherein the step of determining the parameters further comprises:

finding a specular component generated by reflecting light emitted by a light source off a surface of the polygon; and determining the parameters representing the at least one image characteristic using the specular component when the at least one image characteristic is the brightness.

16. The computer-readable recording medium according to claim 13, wherein the method further comprises altering the parameters representing the at least one image characteristic as a function of time.

17. The computer-readable recording medium according to claim 13, wherein the table is divided into a plurality of zones representing at least one of different colors and different illumination conditions.

18. The computer-readable recording medium according to claim 13, wherein the table is provided as a plurality of tables representing at least one of different colors and different illumination conditions.

19. A system for performing a rendering process, comprising:

a processor operable to execute instructions; the instructions including:

determining parameters representing at least one image characteristic for each vertex of a polygon, the at least one image characteristic being selected from the group consisting of color tone and brightness, generating respective texel coordinates for each of a plurality of pixels representing the polygon, and referencing a table using the respective texel coordinates to obtain a corresponding value of the at least one image characteristic for each of the plurality of pixels, the table having values representing different combinations of color tone and brightness arranged by position such that the values vary along one coordinate axis by gradation of color tone and vary along another coordinate axis by gradation of brightness.

* * * * *

UNITED STATES PATENT AND TRADEMARK OFFICE
CERTIFICATE OF CORRECTION

PATENT NO. : 6,833,836 B2
DATED : December 21, 2004
INVENTOR(S) : Shinya Wada

It is certified that error appears in the above-identified patent and that said Letters Patent is hereby corrected as shown below:

<u>Title Page,</u>
Item [74], *Attorney, Agent, or Firm*, "Lenner" should read -- Lerner --.

<u>Colunm 11,</u>
Line 30, "of" should read -- off --.

Signed and Sealed this

Fifteenth Day of March, 2005

JON W. DUDAS
*Director of the United States Patent and Trademark Office*